US008087698B2

(12) United States Patent
Jones et al.

(10) Patent No.: US 8,087,698 B2
(45) Date of Patent: Jan. 3, 2012

(54) PERSONALIZING ID DOCUMENT IMAGES

(75) Inventors: Robert Jones, Andover, MA (US); Victor L. Andelin, Kendallville, IN (US); Daoshen Bi, Boxborough, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 730 days.

(21) Appl. No.: 12/141,800

(22) Filed: Jun. 18, 2008

(65) Prior Publication Data

US 2009/0315318 A1 Dec. 24, 2009

(51) Int. Cl.
*G09C 3/00* (2006.01)

(52) U.S. Cl. ................ 283/77; 283/94; 283/70; 283/74; 283/75

(58) Field of Classification Search .................... 283/94, 283/70, 74, 75, 77
See application file for complete search history.

(56) References Cited

U.S. PATENT DOCUMENTS

| | | | | |
|---|---|---|---|---|
| 6,817,530 | B2 * | 11/2004 | Labrec et al. | 235/487 |
| 2004/0011874 | A1 * | 1/2004 | Theodossiou et al. | 235/488 |
| 2004/0245346 | A1 * | 12/2004 | Haddock | 235/492 |
| 2005/0035590 | A1 * | 2/2005 | Jones et al. | 283/74 |
| 2005/0230959 | A1 | 10/2005 | Nemeth | |
| 2006/0138243 | A1 | 6/2006 | Bi et al. | |
| 2008/0036194 | A1 * | 2/2008 | Golaire et al. | 283/67 |

OTHER PUBLICATIONS

International Search Report International Application No. PCT/US2009/047823.

* cited by examiner

*Primary Examiner* — Dana Ross
*Assistant Examiner* — Matthew G Katcoff
(74) *Attorney, Agent, or Firm* — Mintz, Levin, Cohn, Ferris, Glovsky and Popeo, P.C.

(57) ABSTRACT

A security feature for an identification document comprising a document substrate, a first security feature applied to the document substrate, and an image of a bearer of the identification document transferred over the first security feature. The image includes a knockout portion in which selected areas of the image are not transferred to the substrate. The selected areas expose the first security feature and selected areas are in the form of personal information of the bearer of the document.

26 Claims, 4 Drawing Sheets

PERSONALIZING ID DOCUMENT IMAGES

RELATED APPLICATION DATA

Technical Field

This application relates to secure documents and more specifically relates to security features for secure documents and identification documents.

BACKGROUND AND SUMMARY

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, smart cards (e.g., cards that include one more semiconductor chips, such as memory devices, microprocessors, and microcontrollers), contact cards, contactless cards, proximity cards (e.g., radio frequency (RFID) cards), visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry certain items of information which relate to the identity of the bearer. Examples of such information include name, address, birth date, signature and photographic image; the cards or documents may in addition carry other variable data (i.e., data specific to a particular card or document, for example an employee number) and invariant data (i.e., data common to a large number of cards, for example the name of an employer). All of the cards described above will be generically referred to as "ID documents".

FIGS. 1 and 2 illustrate a front view and cross-sectional view (taken along the A-A line), respectively, of an identification (ID) document 10. In FIG. 1, the ID document 10 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint, a facial image or template, or iris or retinal template), a magnetic stripe (which, for example, can be on a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a preprinted core 20 (also referred to as a substrate). In many applications, the core can be a light-colored, opaque material (e.g., a filled polyolefin substrate (like TESLIN® substrate, a silica filled polyolefin printing substrate available from PPG Industries), polyvinyl chloride (PVC) material, polyester, polycarbonate, etc.). The core 20 is laminated with a transparent material, such as clear PVC or polyester material 22, which, by way of example, can be about 1-5 mil thick. The composite of the core 20 and clear laminate material 22 form a so-called "card blank" 25 that can be up to about 30 mils thick. Information 26*a-c* is printed on the card blank 25 using a method such as Laser Xerography, laser engraving, offset press, ink jet or Dye Diffusion Thermal Transfer ("D2T2") printing (e.g., as described in commonly assigned U.S. Pat. No. 6,066,594, which is incorporated hereto by reference in its entirety.) The information 26*a-c* can, for example, comprise variable information (e.g., bearer information) and an indicium or indicia, such as the invariant or non-varying information common to a large number of identification documents, for example the name and logo of the organization issuing the documents. The information 26*a-c* may be formed by any known process capable of forming the indicium on the specific core material used.

To protect the information that is printed, an additional layer of transparent overlaminate 24 can be coupled to the card blank and printed information. Illustrative examples of usable materials for overlaminates include biaxially oriented polyester or other optically clear durable plastic film.

"Laminate" and "overlaminate" include, but are not limited to film and sheet products. Laminates used in documents include substantially transparent polymers. Examples of laminates used in documents include polyester, polycarbonate, polystyrene, cellulose ester, polyolefin, polysulfone, and polyamide. Laminates can be made using either an amorphous or biaxially oriented polymer. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers can vary and is typically about 1-20 mils. Lamination of any laminate layer(s) to any other layer of material (e.g., a core layer) can be accomplished using a lamination process.

In ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. A co-extruded lamination technology described in this document also appears in U.S. Patent Application Publication No. 2005-0084693. Each of these U.S. patents and applications is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

In a typical ID document, one or more laminate layers are joined together with the substrate, possibly including other security devices, such as holograms, integrated circuits, optical memory, RFID tag, etc. to form a complete document. These laminate layers are designed to enhance the durability and security of the identification documents. From the standpoint of durability, the laminate should increase the document's ability to withstand wear and tear experienced in the field, including heat and humidity that can compromise the integrity of the document structure.

Despite advances in security features, counterfeiting still poses a problem. Further, though sophisticated security features and personalization methods exists, they are often cost prohibitive to include on certain classes of documents. Photo-swapping and other methods of altering the personal information on an ID document are still common security threats. As such, there is a need for security features and methods of making ID documents that are both cost effective, yet deter counterfeiting.

One aspect of the invention is a security feature for an identification document comprising a document substrate, a first security feature applied to the document substrate, and an image of a bearer of the identification document printed over the first security feature. The image includes a knockout portion in which selected areas of the image are not printed. The selected areas expose the first security feature and selected areas are in the form of personal information of the bearer of the document.

Another aspect of the invention is a method of creating a security feature for an identification document. The method comprises providing a document substrate, applying a first security feature to the document substrate, receiving an image of a bearer of the identification document, and forming a knockout portion in selected areas of the image. The selected areas are in the form of personal information of the bearer of the document. The method prints the image of the bearer except for the knockout portion over the first security feature. The selected areas of the knockout portion expose the first security feature.

The aspects of the invention are not intended to be limited to those specifically mentioned here, but instead, are intended to encompass various methods, document structures, compositions and articles comprising combinations of the teachings within this document.

BRIEF DESCRIPTION OF THE DRAWINGS

The advantages, features, and aspects of embodiments of the invention will be more fully understood in conjunction with the following detailed description and accompanying drawings, wherein.

Figure 1:
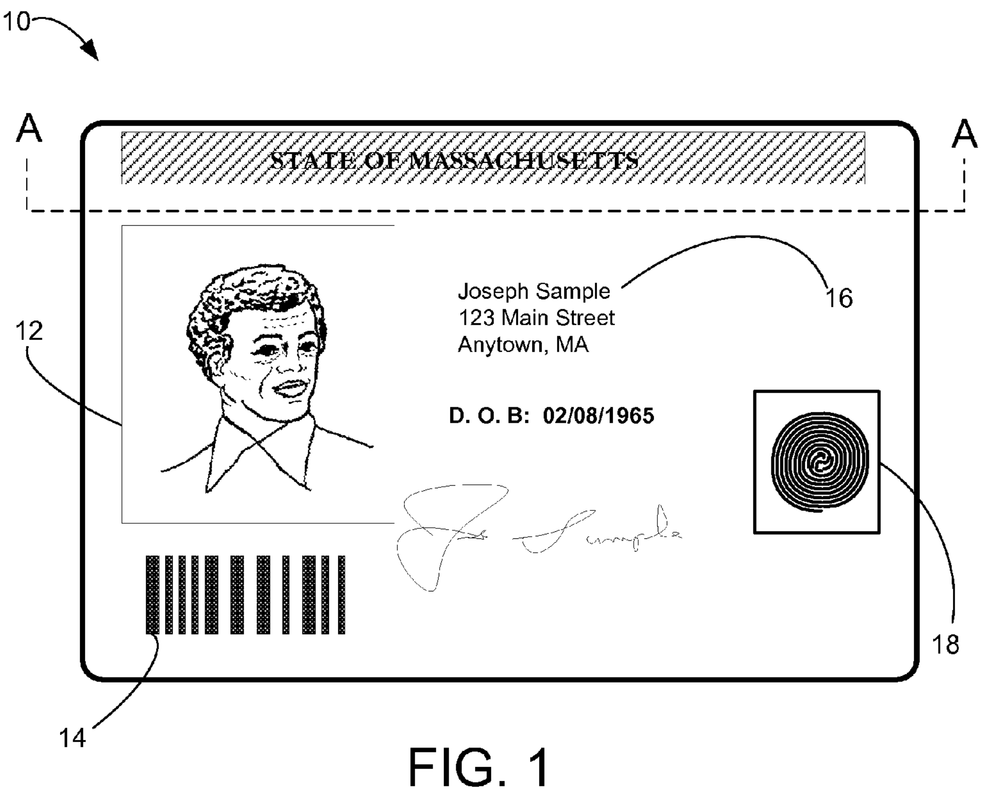
FIG. 1 is an illustrative example of an identification document.
Figure 2:
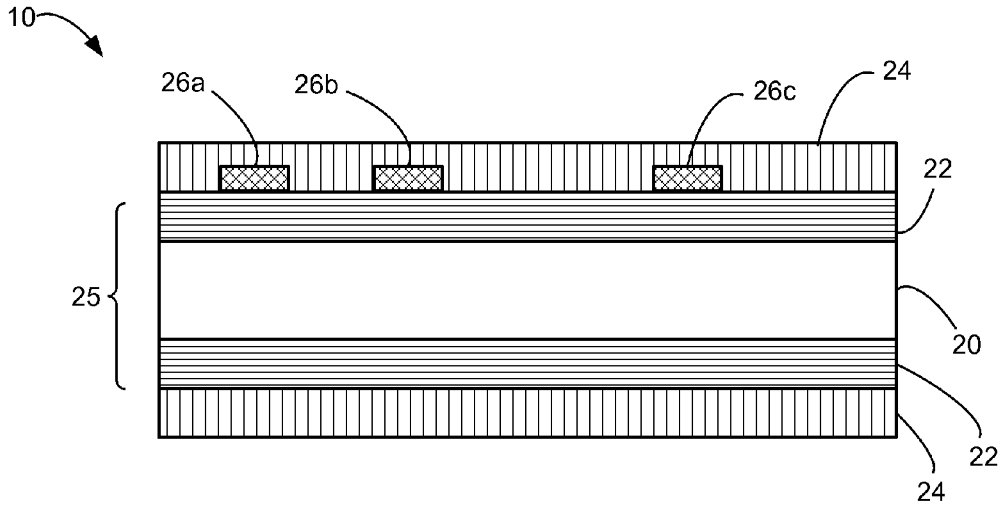
FIG. 2 is an illustrative cross section of the identification document of FIG. 1, taken along the A-A line.

Of course, the drawings are not necessarily drawn to scale, with emphasis rather being placed upon illustrating the principles of the invention. In the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

For purposes of illustration, the following description will proceed with reference to ID document structures (e.g., filled polyolefin-core or Polycarbonate-core, multi-layered ID documents). It should be appreciated, however, that the invention is not so limited. Indeed, as those skilled in the art will appreciate, the inventive techniques can be applied to many other structures formed in many different ways.

Figure 3:
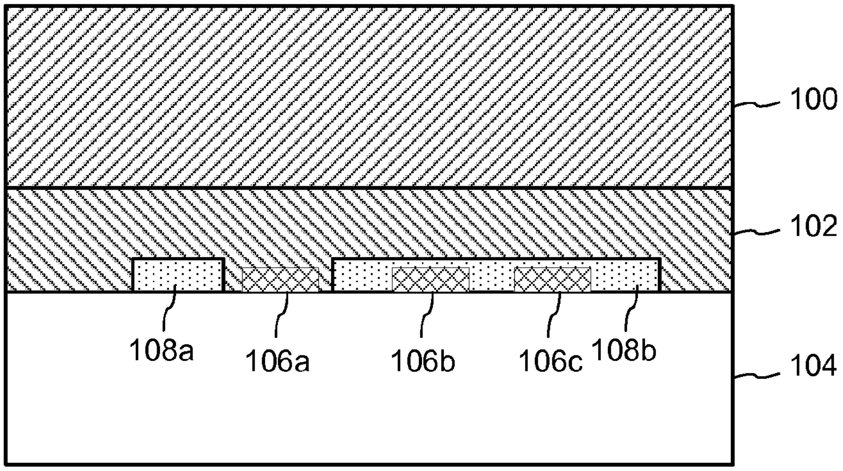
FIG. 3 is a diagram illustrating a cross section of an identification document including an image of the document bearer with a personalized knockout feature exposing underlying features on the document.

FIG. 3 is a diagram illustrating a cross section of an identification document including an image of the document bearer with a personalized knockout feature exposing underlying features on the document. The identification document is a multi-layer structure, and FIG. 3 depicts a representative example of document layers. Layers 100 and 102 comprise a protective laminate layer formed by co-extruding polymer layers together, such as described in U.S. Patent Publication 2005-0084693 referenced above. Layer 104 represents a document substrate, which may serve as the core of the ID document and may comprise one or more layers. In this particular embodiment, the document substrate is a printable core layer of the ID document (e.g., 10 Mil Teslin® synthetic core or inlay to a multi-layer document structure).

Elements 106*a-c* represent a first security feature applied to the substrate, and aspects of this feature are partially or completely exposed by a knockout portion of the printable material 108 representing an image of the bearer. A printable material 108*a-b* representing an image of the bearer 108*a-b* is applied over the first security feature, except in selected areas that form knockout portion. The cross sectional view of FIG. 3 shows an example of a knockout between elements 108*a* and 108*b*. In this area, a portion of the image of the bearer is selectively not printed to form a knockout. This exposes a portion of the first security feature 106*a*, which is visible through the transparent overlaminate layers 102-104. As explained and illustrated in further examples below, this knockout preferably takes the form of human readable information derived from personal information of the bearer, such as a date of birth, driver's license number, handwritten signature, address or other personal information printed elsewhere on the document, or a hash of personal information.

Variants of the above feature may be included in images of bearer information in other areas of the ID document, such as ghost images and images printed in covert inks or toners.

Figure 4:
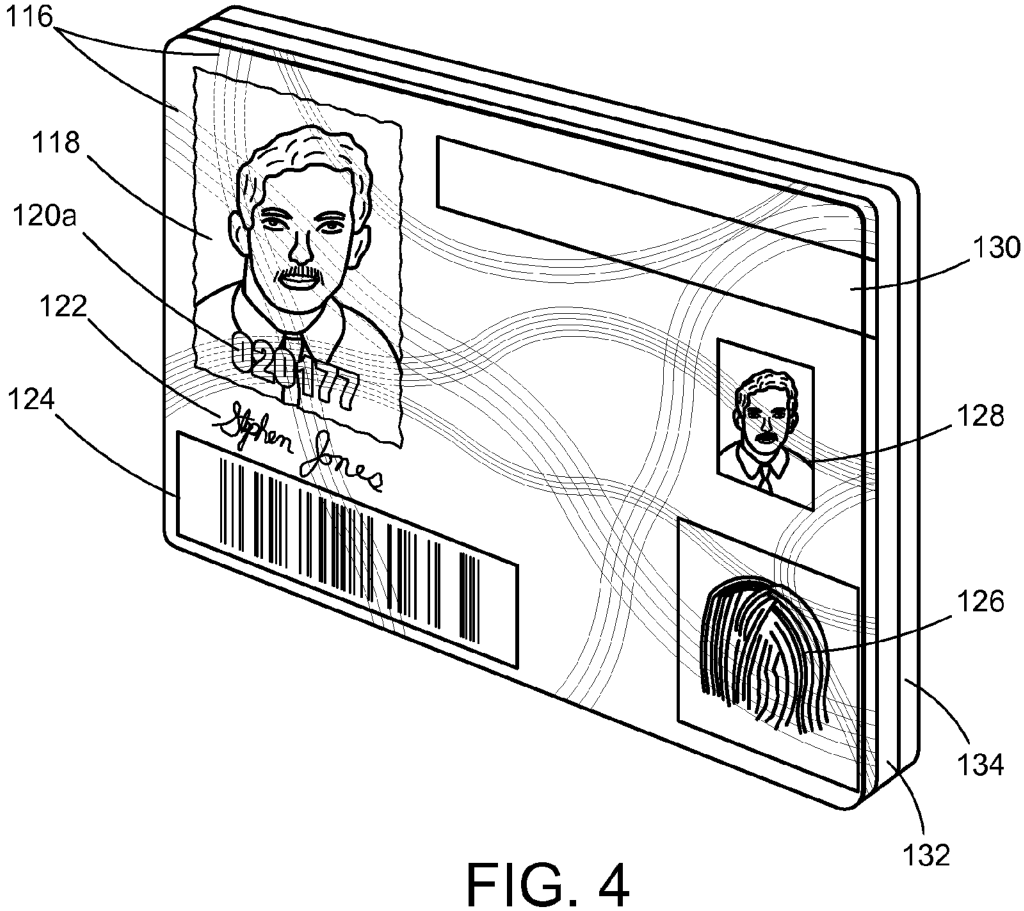
FIG. 4 is a diagram illustrating an example of an identification document with a knockout feature within a facial photo of the document's bearer.

To further demonstrate this knockout feature, FIG. 4 is a diagram illustrating examples of interlocking a security feature 116 with a facial photo 118 through a knockout 120*a* in the photo. The ID document of FIG. 4 includes a security image pattern 116 pre-printed on the core layer that is exposed through a knockout portion 120*a* in the form of text characters derived from personal information of the bearer. In this example, the security image pattern 116 comprises a fine line structure similar to a guilloche pattern. Upon closer examination of the lines that comprise the security image 116 in FIG. 4, one can see that they are depicted as solid lines in the background of the ID document outside the photo 118, they appear as broken lines when covered by the material used to print the photo 118, and they appear as solid again in the knockout portion 120*a* to reflect that they are unobstructed by the material used to print the photo in the knockout. This use of broken and solid lines reflects that, in this embodiment, the material or image transfer method used to print the photo at least partially obscures the security image. Depending on the materials used for the first security feature and the printing material/method for the photo, the first security feature may be partially visible or not behind the photo and outside the knockout. Some printing methods, like laser engraving, do not apply a printing material, but instead, print information by causing a reaction in the substrate. For example, a laser engraver causes a visible color change, darkening or removal of substrate that transfers an image to the substrate. In this case, the laser can be used to obscure the first security feature by its selective darkening, color change, or removal of the first security feature in areas of the photo outside the knockout portion.

The security image is designed using a vector image software design tool such as the GS Software package from Jura. Using such a tool, we introduce anti-counterfeiting properties into the security image like fine line structure and line spacing, varying screen angles, frequency attributes, high resolution structures, etc. that are difficult to reproduce using typical consumer desktop scanning and printing equipment. The security image is converted for printing through a raster image process for a target printer (e.g., a card printer for OTC, central issue printer, or other printer used for pre-printing card stock for either OTC or central issue processes). The security image is then printed on the substrate, preferably using a particular security ink such a spot color, out-of-gamut ink, covert ink, etc. that is not commonly available or easy to reproduce.

In example embodiments, we have designed a security image of a fine line structure (possibly including an ultraviolet fine line structure) that is immediately behind the knockout area and that extends behind the photo and into the general background area. It is preferable for the feature to be visible through the "knockout" and to also be visible just outside the photo area so that the two are connected by the person authenticating the credential. It can be both visible to the unaided eye and/or visible in response to non-visible illumination (e.g., UV or IR) with or without microprint.

As shown in FIG. 4, the ID document includes other printed information such as the bearer's signature 122, a bar code 124, biometric image (e.g., fingerprint) 126, ghost image 128, and personal information of the bearer 130 such as name, DL number, date of birth, address, etc. Each of these bearer images are candidates for including a knockout portion. For example, as shown in FIG. 4, the first security feature passes behind the barcode 124, biometric image 126, ghost image 128 and personal information section 130. The images of the bearer, like the facial photo 118, fingerprint image 126 and ghost image 128 are candidates for having knockout portions. In addition, this personal information is candidate information from which the knockout may be derived. This information may be printed on one or more layers of the document, such as the substrate 134, or laminate layers. The printed information is preferably protected via a transparent overlaminate 132. The knockout is created through image editing of the bearer image to clear pixels in selected pixel locations corresponding to the areas of the knockout pattern. Clearing the pixels causes the printer not to print the photo in selected areas forming the knockout pattern.

Figure 5:
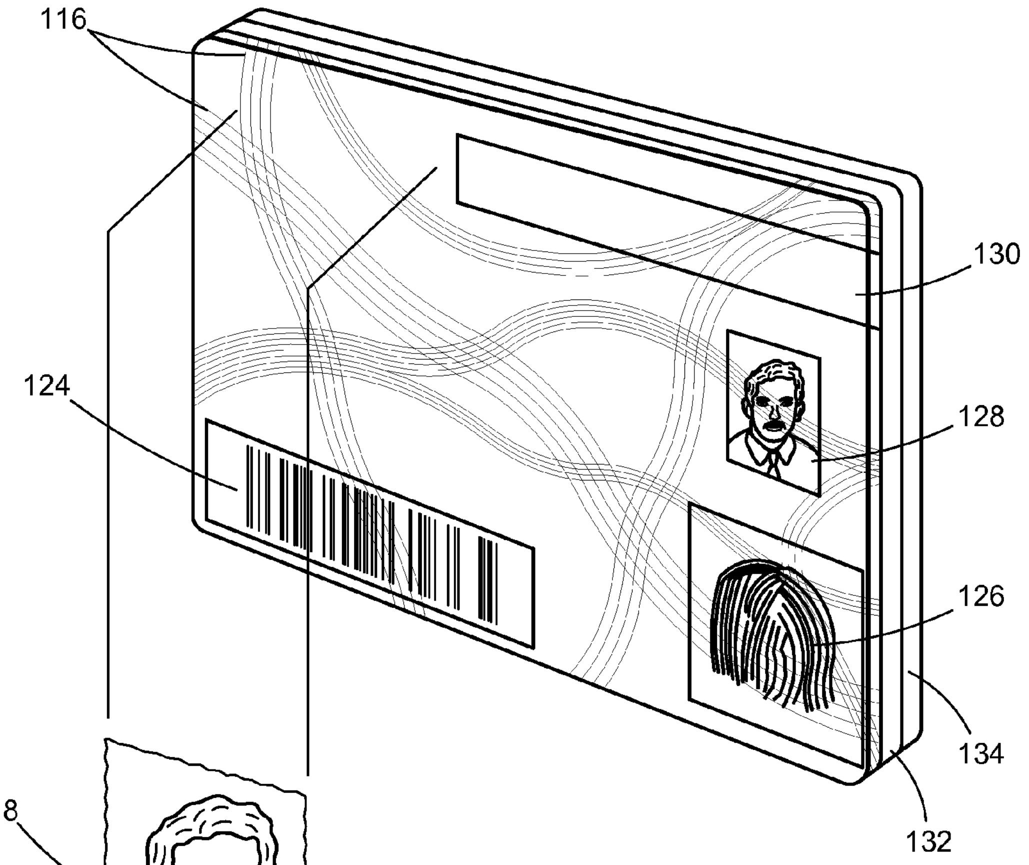
FIG. 5 is a diagram showing the example of FIG. 4 with the facial photo broken out from the identification document to illustrate the knockout feature is implemented as clear pixels in the areas of the characters "020177" representing the bearer's date of birth.

The knockout pattern itself may be the bearer's signature (e.g., 122) or other personal information (e.g., name, date of birth, or address shown in section 130 on the document) that enables a user to authenticate the information upon visual inspection. The example of FIG. 4 shows a knockout in the form of text characters representing the date of birth "020177" or Feb. 1, 1977. FIG. 5 shows a break-away view of the photo 118 to reflect that the knockout 120*a* comprises a clear area in the image, where no image information from the facial photo is transferred to the ID document.

Figure 6:
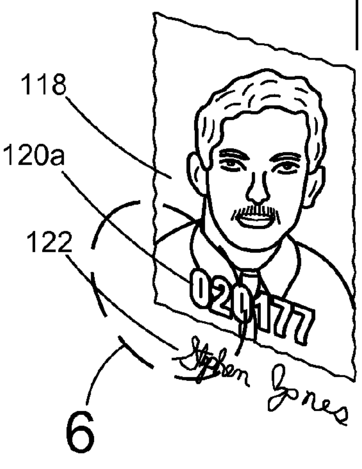
FIG. 6 shows an expanded portion of the facial photo in cut-out area 6 to show how microtext positioned along the border of the photo creates an uneven edge with text representing personal information of the bearer (e.g., date of birth).
Figure 6:
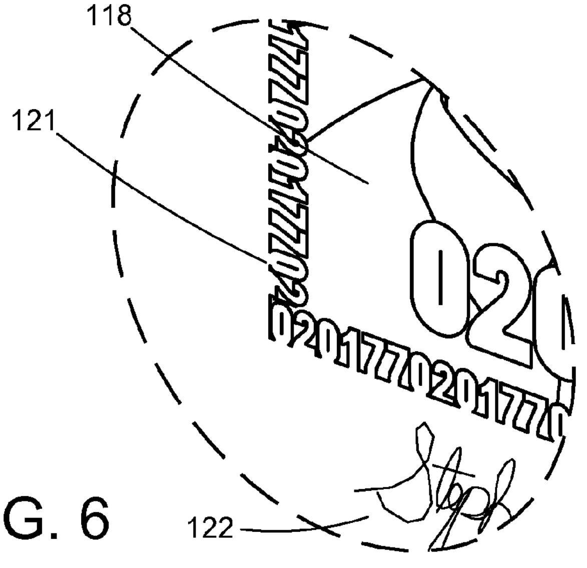

FIG. 6 provides an expanded view of a cut out area 6 of the photo in FIG. 5 to illustrate an example of how the knockout may be applied to the border of the image. This example, in particular, shows microtext 121 around the border of the photo. The microtext characters 121 represent information derived from the personal information of the bearer, such as initials and year date of birth. This example specifically shows the date of birth as "020177", but other personal information may be used. This feature further ties the photo to other information on the card and makes photo swapping even more difficult because the knockout creates an uneven border that is difficult to keep in tact if a counterfeiter attempts to cut out the photo. For example, the microtext 121 forms a knockout along at least one edge of the image of the bearer such that the edge is non-uniform.

As noted, the first security feature may comprises a material (e.g., ink or toner) that is not visible when illuminated with visible light, yet becomes visible when illuminated with a source of illuminated in a non-visible band. In one embodiment, the material of the first security feature comprises an IR or UV ink applied in registration with at least a portion of the knockout portions. The ink may also be applied as a block in the area of the knockout. For example, the ink may be a block of fluorescing UV ink that fluoresces through the knockout when exposed to UV illumination. This provides a helpful mechanism to amplify the knock out feature and enable verification of the personal information it represents, particularly in darkly lit points of inspection such as restaurants, bars, and retail stores.

Another variant for creating a covert layer as part of the first security feature is to apply a security pattern to the substrate and then obscure it with a blocking layer, such as a layer of through which visible illumination does not pass, yet illumination of a particular non-visible band passes. For example, a blocking layer that enables IR to pass can be used to examine the security pattern printed underneath the blocking layer through the area of the knock out portion. The blocking layer is preferably chosen to block the first security feature from human viewing in normal lighting, at least in the area of the knock out feature. One example is to print a layer of material in a process black color (e.g., print a block or stripe of black dye), which is substantially opaque to a human viewer in normal lighting, yet substantially transparent to non-visible energy (e.g., IR) used by the illumination and capture device for detecting and verifying the security image through the knock out portion.

A further level of uniqueness and covertness may be created by using a character encoding protocol to generate knockout characters that causes the character shape to vary with the personal information. For example, different characters are selected from among unique fonts based on the personal information (e.g., each character has a unique font).

A further level of security can be created by setting the knockout feature in registration with attributes of the first security feature. For example, the first security feature may comprise text characters or a pattern. The photo is then printed with a knockout portion that has at least some portions that align with the characters or pattern of the first security feature. Mis-alignment of the two features is then more easily detected by visual inspection.

Yet another level of security and verification can be achieved by making the first security feature a tactile feature raised above the surface of the substrate and extending through the knockout portion. Examples of such a feature are described in U.S. Pat. No. 7,383,999, which is hereby incorporated by reference. In one embodiment, the tactile feature is formed into characters that substantially match the characters of the knockout feature. As should be apparent from these examples, the first security feature exposed in the knockout need not be limited to a particular structure or application method, and may be comprised of a combination of sub-layers or features.

Figure 7:
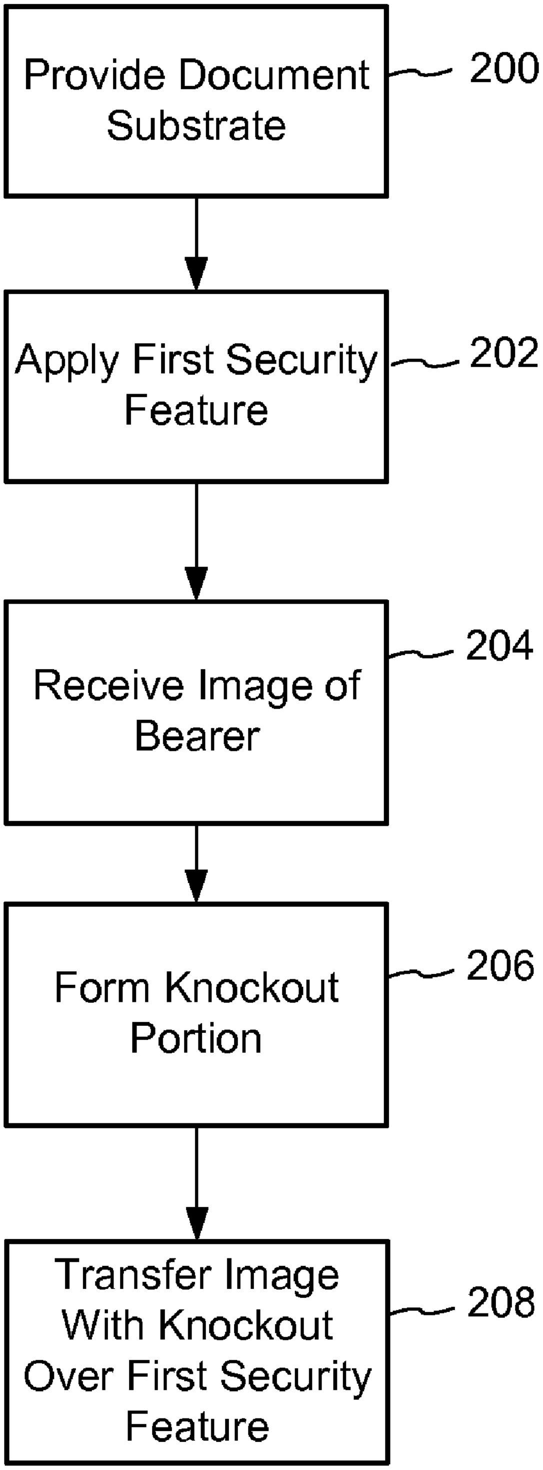
FIG. 7 is a flow diagram illustrating a method for creating a personalized knockout security feature for an identification document.

FIG. 7 is a flow diagram illustrating a method for creating a security feature for an identification document. A document substrate is provided (200). A first security feature is applied to the document substrate (202). At the personalization stage, an image of a bearer of the identification document, such as a facial photo (e.g., the primary photo and/or ghost image), is received (204). An image editing tool forms a knockout portion in selected areas of the image (206). The selected areas are in the form of personal information of the bearer of the document. The image of the bearer, except for the knockout portion, is transferred over the first security feature on the substrate such that the selected areas of the knockout portion expose the first security feature through the bearer image (208).

In the example embodiments depicting line art, the method generates a vector image of a line art security pattern, performs raster image processing (RIP) to convert the vector image to a format for printing, and prints the converted image using an out of gamut or spot color ink. As noted, transfer of the image to the substrate may include laser engraving as well as other printing methods. One printing method employs an offset press with a multi-color process (e.g., CMYK plus one or more additional spot colors, out of gamut inks or other special inks). In this offset method, the security pattern is used to create a special printing plate to apply the security pattern to sheets of substrate. This enables vector art at high resolution to be generated and transferred to the substrate using special inks/colors (e.g., one or more spot colors). Resolutions around 2400 and 4064 DPI have been used for the vector art generation and the RIP, with the resolution varying with the capability of the printer. The use of design software such as the GS Software package from Jura enables us to vary the parameters of the RIP and output images for different types of printers and document issuing processes.

In the context of central issue processing, the substrate is typically in the form of a sheet material, and different documents are printed on the sheet of core material as it moves through a first stage of printing. In central issue manufacturing, personal information from applicants is obtained at an enrollment site (e.g., a DMV site for driver's license issuance), and sent to a central issue manufacturing facility, where it is queued for printing on sheets of core material. The security image may be pre-printed on sheets of the substrate prior to personalization using a special printer (such as an offset press) using spot colors or other special effects unique to that printer. The security image may also be printed on the substrate using the same printer as the one that applies the photo and other personal information, such as an Indigo, Xerographic, or other printer technology.

For over the counter issuance, the substrate may also be pre-printed with information. However, the card stock is manufactured prior to enrollment, and is personalized at the time of enrollment in an "over the counter" enrollment process, where personal information is obtained and then printed on individual cards in an over the counter card printer.

The co-extruded laminate referenced above may be used as the laminate. This co-extruded laminate is applied with heat and pressure, but without an adhesive due to the bonding properties of the laminate with the core material. As such, the laminate is joined directly to the front and/or back of the core. A roll-to-roll or platen press can be used to join the surface of the laminate with bonding property to the core. To create a platen press version, A150 is replaced by a polymer that does not crystallize under conditions typically found in a platen press process or the press cycle is adjusted so that crystallization does not occur to a substantial level or degree.

In one embodiment for central issue, the co-extruded laminate described above is used for both top and bottom card lamina and a TESLIN core, preprinted with bearer information and photo using a Xerox Doc 12 xerographic printer. In this case, the document structure is laminated at interface temperatures in excess of 280 F at standard pressures and line speeds of ~0.5 μm at current configuration. Preprint patterns/coverage is limited around each card's perimeter to within a minimum of about 0.125"—thus ensuring an aggressive bond of the co-extruded laminate to the TESLIN core even at "intrusion" temperatures.

While the discussion above provides examples suitable for a central issue environment, where personalized information is available at the time of document manufacture, variations of the process may be used to create card stock used for over the counter issuance. For example, the first security feature may be applied to card stock. One or more over-laminate layers and a D2T2 image receiver layer may be subsequently added over pre-applied security features to enable the blank card to be printed with personal information at an over-the-counter issuance facility.

Manufacture and Printing Environments

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

A CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally comprise an opaque core material (also referred to as "substrate"), such as paper or plastic, sandwiched between two or more layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if large volumes of ID documents are manufactured.

U.S. Pat. No. 6,817,530, which is hereby incorporated by reference, describes approaches for manufacturing identification documents in a central issue process.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document. It will be appreciated that an OTC card issuing process is by its nature can be an intermittent—in comparison to a continuous—process.

OTC identification documents of the types mentioned above can take a number of forms, depending on cost and desired features. Some OTC ID documents comprise plasticized poly (vinyl chloride) or have a composite structure with polyester laminated to 0.5-2.0 mil (13-51 .mu.m) poly(vinyl chloride) film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the printhead, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the printhead. The choice of laminate dictates the degree of durability and security imparted to the system in protecting the image and other data.

CONCLUDING REMARKS

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while FIG. 1 illustrates a particular species of ID document—a driver's license—the present invention is not so limited. Indeed our inventive methods and techniques apply generally to all identification documents defined above. Moreover, our techniques are applicable to non-ID documents. Further, instead of ID documents, the inventive techniques can be employed with product tags, product packaging, business cards, bags, charts, maps, labels, etc., etc. The term ID document is broadly defined herein to include these tags, labels, packaging, cards, etc.

It should be understood that various printing processes could be used to create the identification documents described in this document. It will be appreciated by those of ordinary skill in the art that several print technologies including but not limited to indigo (variable offset) laser xerography (variable printing), offset printing (fixed printing), inkjet (variable printing), dye infusion, mass-transfer, wax transfer, variable dot transfer, laser engraving can be used to print variable and/or fixed information on one or more layers of the document. The information can be printed using dots, lines or other structures of varying colors to form text or images. The information also can comprise process colors, spot or pantone colors.

It should be understood that, in the Figures of this application, in some instances, a plurality of method steps may be shown as illustrative of a particular method, and a single method step may be shown as illustrative of a plurality of a particular method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention.

Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

What is claimed is:

1. A security feature for an identification document comprising:

a document substrate;

a first security feature applied to the document substrate; and an image of a bearer of the identification document printed over the first security feature, the image including a knockout portion in which selected areas of the image are not printed, wherein the knockout portion exposes the first security feature, the knockout portion being in the form of personal information of the bearer of the document.

2. The security feature of claim 1 wherein the knockout portion forms text characters representing the personal information of the bearer.

3. The security feature of claim 2 wherein the text characters include microtext.

4. The security feature of claim 3 wherein the microtext forms a knockout along at least one edge of the image of the bearer such that the edge is non-uniform.

5. The security feature of claim 1 wherein the image of the bearer comprises a facial photo.

6. The security feature of claim 1 wherein the knockout portion comprises a representation of a handwritten signature of the bearer.

7. The security feature of claim 1 wherein the first security feature comprises fine line printing.

8. The security feature of claim 1 wherein the first security feature comprises an ink that is not visible when illuminated with visible light, yet becomes visible when illuminated with a source of illuminated in a non-visible band.

9. The security feature of claim 8 wherein the ink comprises an IR or UV ink applied in registration with at least a portion of the knockout portions.

10. The security feature of claim 1 wherein the knock out portion form characters in a font that is unique to the characters.

11. The security feature of claim 1 wherein the first security feature comprises a print structure that is registered to the knockout portion.

12. The security feature of claim 1 wherein the first security feature includes a blocking layer through which illumination of a particular band passes.

13. The security feature of claim 1 wherein the first security feature comprises a tactile feature raised above the surface of the substrate and extending through the knockout portion.

14. A method of creating a security feature for an identification document comprising:

providing a document substrate;

applying a first security feature to the document substrate;

receiving an image of a bearer of the identification document;

forming a knockout portion in selected areas of the image, the selected areas are in the form of personal information of the bearer of the document; and printing the image of the bearer except for the knockout portion over the first security feature, wherein the selected areas of the knockout portion expose the first security feature.

15. The method of claim 14 including forming the knockout portion as text characters representing the personal information of the bearer.

16. The method of claim 15 wherein the text characters include microtext.

17. The method of claim 16 wherein the microtext forms a knockout along at least one edge of the image of the bearer such that the edge is non-uniform.

18. The method of claim 14 wherein the image of the bearer comprises a facial photo.

19. The method of claim 14 wherein the knockout portion comprises a representation of a handwritten signature of the bearer.

20. The method of claim 14 including forming the first security feature by generating a vector image of a line art security pattern, performing raster image processing to convert the vector image to a format for printing, and printing the converted image using an out of gamut or spot color ink.

21. The method of claim 14 wherein the first security feature comprises an ink that is not visible when illuminated with visible light, yet becomes visible when illuminated with a source of illuminated in a non-visible band.

22. The method of claim 21 wherein the ink comprises an IR or UV ink applied in registration with at least a portion of the knockout portions.

23. The method of claim 14 wherein the knock out portion form characters in a font that is unique to the characters.

24. The method of claim 14 wherein the first security feature comprises a print structure that is registered to the knockout portion.

25. The method of claim 14 wherein the first security feature includes a blocking layer through which illumination of a particular band passes, and including applying a first pattern on the substrate, and applying the blocking layer over the pattern in an area of the knockout.

26. The security feature of claim 14 wherein the first security feature comprises a tactile feature raised above the surface of the substrate and extending through the knockout portion.

* * * * *